(12) United States Patent
Ohno et al.

(10) Patent No.: US 7,311,274 B2
(45) Date of Patent: Dec. 25, 2007

(54) ANTISLIP MATERIAL EJECTOR

(75) Inventors: Kaoru Ohno, Tokyo (JP); Kazuya Gushima, Tokyo (JP); Kosuke Honda, Saitama (JP)

(73) Assignees: Railway Technical Research Institute, Kokubunji-shi, Tokyo (JP); Tess Co., Ltd., Kunitachi-shi, Tokyo (JP)

( * ) Notice: Subject to any disclaimer, the term of this patent is extended or adjusted under 35 U.S.C. 154(b) by 956 days.

(21) Appl. No.: 10/442,536

(22) Filed: May 20, 2003

(65) Prior Publication Data

US 2004/0071558 A1 Apr. 15, 2004

(30) Foreign Application Priority Data

Oct. 11, 2002 (JP) ............................ 2002-298598

(51) Int. Cl.
*B60B 39/00* (2006.01)
*B60B 39/08* (2006.01)
*B60B 39/04* (2006.01)
*B60B 39/02* (2006.01)
*B61C 15/10* (2006.01)
*B61C 15/08* (2006.01)
*B65G 53/14* (2006.01)

(52) U.S. Cl. .................... 239/654; 239/174; 291/3; 291/24; 291/46; 406/153

(58) Field of Classification Search ........... 239/654, 239/174, 146, 173, 302, 433, 434, 650, 655; 291/3, 24, 46, 11.1, 11.3, 38, 41; 406/153, 406/39, 151, 152, 191, 194, 195
See application file for complete search history.

(56) References Cited

U.S. PATENT DOCUMENTS

| | | | | |
|---|---|---|---|---|
| 1,352,626 A | * | 9/1920 | Power | 105/101 |
| 1,795,105 A | * | 3/1931 | Buyck | 291/3 |
| 2,999,711 A | * | 9/1961 | Sturmer | 291/3 |
| 3,020,071 A | * | 2/1962 | Makinson | 291/11.3 |
| 5,580,106 A | * | 12/1996 | Dulberg et al. | 291/3 |
| 6,722,589 B1 | * | 4/2004 | Ohno et al. | 239/654 |

FOREIGN PATENT DOCUMENTS

| | | |
|---|---|---|
| DE | 438 382 | 12/1926 |
| DE | 20 48 731 A1 | 4/1972 |
| EP | 1 182 109 A1 | 2/2002 |
| JP | 40-15516 | 6/1965 |
| JP | 4-310464 | 11/1992 |
| JP | 2001-260876 | 9/2001 |
| WO | 01-68432 | 9/2001 |

* cited by examiner

*Primary Examiner*—Darren Gorman
(74) *Attorney, Agent, or Firm*—Darby & Darby PC

(57) ABSTRACT

An antislip material ejector comprises an antislip material container 12 which stores antislip material, an air inlet pipe 13 which is arranged in the antislip material container, a compressed air supply pipe 14 which supplies compressed air to the air inlet pipe, a nozzle portion 16 which is arranged in the air inlet pipe, a mixing pipe 17, which is connected with the air inlet pipe, in which the antislip materials are mixed with air and in which a suction hole 18 is formed through which the antislip material passes, a connecting pipe, one end of which communicates with the mixing pipe and the other end of which communicates with a cavity in the antislip material container, and an ejection pipe 20 which is connected with the mixing pipe and which ejects the antislip material together with the compressed air.

11 Claims, 4 Drawing Sheets

ANTISLIP MATERIAL EJECTOR

BACKGROUND OF THE INVENTION

1. Field of the Invention

The present invention relates to an antislip material ejector which ejects antislip materials between a wheel of a railcar and a rail so as to maintain frictional contact therebetween.

2. Background Art

Various kinds of apparatuses which eject antislip materials, such as grit etc. so as to avoid slipping between a wheel of a railcar and a rail and also to maintain frictional contact between the wheel and the rail have been proposed for the railcars which run on rails at high speed.

For instance, an apparatus, which comprises a grit box which stores grit, a ejection pipe which is connected to the grit box, and an air pipe which supplies air to the grit box, and which ejects grit between wheels and rails by supplying compressed air to the ejection pipe so as to push the grit out of the ejection pipe together with the compressed air is disclosed in Japanese Unexamined Patent Application Document Hei 4-310464.

In the above antislip material ejector, it is necessary to control the pressure of the compressed air which is charged in the grit box to vary the discharge rate of the grit to be ejected. However, when the pressure of the compressed air is not sufficient, for instance less than 500 kPa, power necessary for ejecting the grit decreases and the ejecting discharge rate of the grit is not stable or is not sufficient.

Furthermore, the grit and other kinds of the antislip materials tend to be compressed and also to be caked by a vibration of the railcar and the pressure of the compressed air, and therefore the discharge rate of the grit which is ejected by the same pressure of the compressed air decreases. In order not to decrease the discharge rate of the grit, it becomes necessary to adjust a needle valve of the above antislip material ejector in order to maintain a necessary ejection discharge rate of the grit.

In a case in which a plurality of ejection pipes are arranged in a single grit box, it is not possible to control the discharge rate of the ejecting particle for each of the ejection pipes, because an ejecting rate of the grit can be varied only by the pressure of the gritbox and the ejection pipes which are connected with the same gritbox are pressurized by the compressed air of the gritbox.

When a valve which controls the discharge rate of the ejecting particles is arranged in a ejection line between the gritbox and a ejection nozzle, some problems occur. For instance, the valve has parts which touch and slide past each other and these parts are damaged by the grit therebetween. Because the grit box is pressurized by the compressed air, it is necessary to make the grit box to be pressure sealed and it is also necessary to make the gritbox have high structural strength. Therefore, cost for making the gritbox thus constructed is increased.

In order to overcome the above problems, the present invention seeks to provide a antislip material ejector which ejects antislip material which is drawn from an antislip material container together with compressed air by using a venturi effect in a mixing pipe.

SUMMARY OF THE INVENTION

The present invention was made in the view of the above-mentioned problems and seeks to provide an antislip material ejector which draws antislip material from an antislip material container together with compressed air by the Venturi effect.

An aspect of the present invention, is an antislip material ejector comprising an antislip material container which stores antislip materials, an air inlet pipe which is arranged in the antislip material container, a compressed air supply pipe which supplies compressed air to the air inlet pipe, a nozzle portion which is arranged in the air inlet pipe, a mixing pipe, which is connected with the air inlet pipe, in which the antislip material is mixed with air and in which a suction hole is formed and through which the antislip material pass, an ejection pipe which is connected with the mixing pipe and which ejects the antislip materials together with the compressed air, wherein, the nozzle portion is arranged in the air inlet pipe so as to adjust the distance to the suction hole.

Another aspect of the present invention is an antislip material ejector further comprising a connecting pipe, one end of which communicates with the mixing pipe and the other end of which communicates with a cavity in the antislip material container.

Another aspect of the preset invention is an antislip material ejector, in which the nozzle portion is fixed by a lock nut so that it does not move in an axial direction.

Another aspect of the present invention is an antislip material ejector in which the compressed air supply pipe comprising a plug which is inserted into the compressed air supply pipe along the axis and which can be pulled out of the air supply pipe.

Another aspect of the present invention is an antislip material ejector in which the air inlet pipe comprising a hole through which the compressed air in the compressed air supply pipe flows into the antislip material container.

Another aspect of the present invention is an antislip material ejector according in which the suction hole is directed downward.

Another aspect of the present invention is an antislip material ejector in which the nozzle portion is engaged with an internal thread which is formed in an inner face of the air inlet pipe so as to adjust the position along the axis by a tool which is inserted from an opening which is formed by removing the plug which is inserted into one end of the compressed air supply pipe.

Another aspect of the present invention is that antislip material ejecting devices are arranged in the antislip material container, and each of the antislip material ejecting devices comprises an air inlet pipe having an air discharging hole, a nozzle portion which is arranged in the air inlet pipe, a mixing pipe in which the antislip materials are mixed with air and in which the suction hole is formed through which the antislip material pass, an ejection pipe which is connected with the mixing pipe and which ejects the antislip material together with compressed air, wherein, a discharge rate from each of the antislip material ejecting devices can be arbitrarily set.

The antislip material ejectors thus constructed can stably eject the antislip material by the compressed air which may have a broad range of air pressure. Moreover, because the blow hole blows the compressed air into the antislip materials in the antislip material container so as to loosen the antislip material, it is possible to prevent a decreasing of the ejecting rate of the antislip materials due to be caked. Furthermore, because there is no portion to which the antislip materials intrude, it is possible to prevent the wear of part of the antislip material ejector.

DETAILED DESCRIPTION OF THE INVENTION

Figure 1:
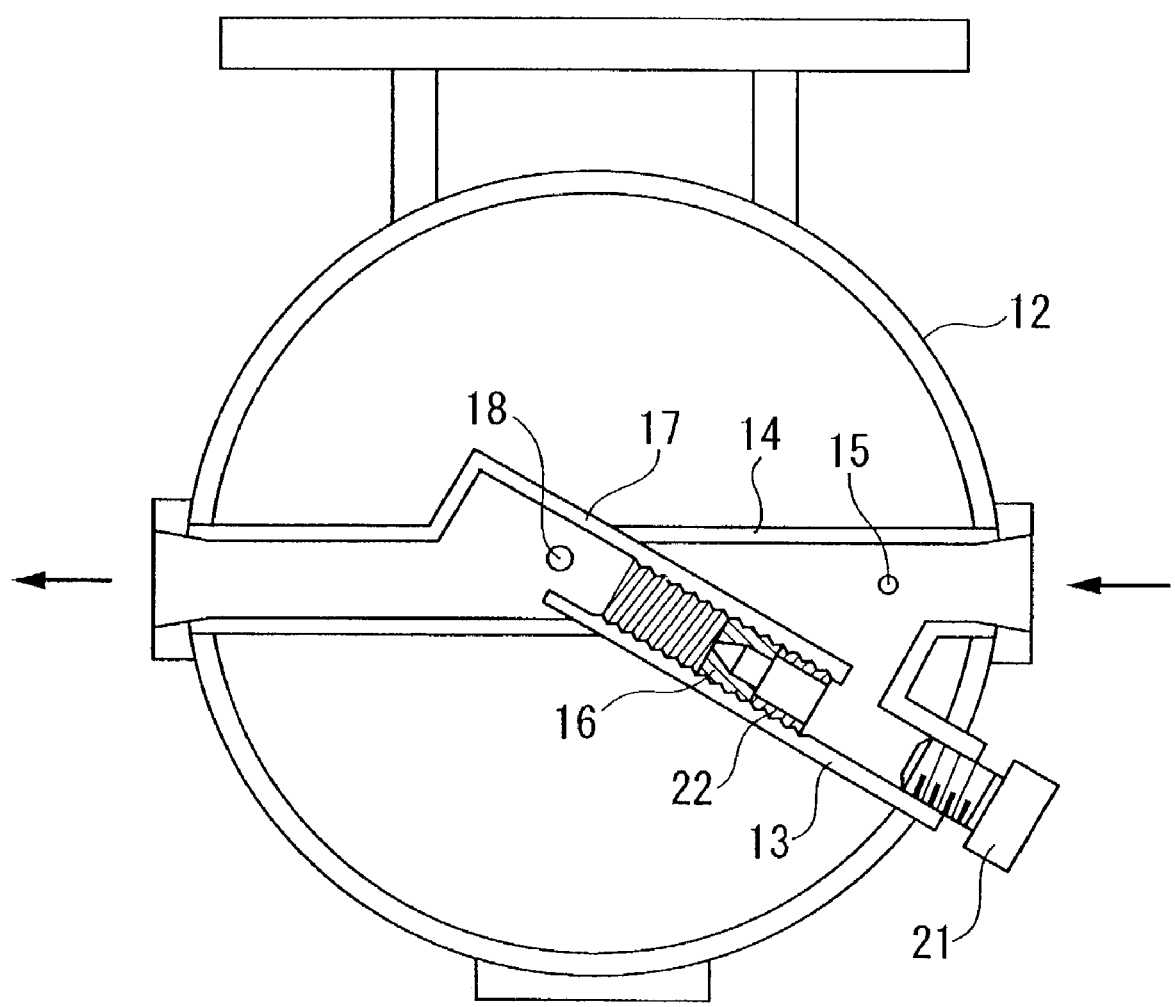
FIG. 1 is a longitudinal sectional view of an antislip material ejector of a first embodiment of the present invention.

Hereinafter, the first embodiment of the present invention will be explained. FIG. 1 is a longitudinal sectional view of the first embodiment of the antislip material ejector. The antislip material ejector 10 comprises, an antislip material container 12 which contains antislip material 11, an air inlet pipe 13 which is arranged in the antislip material container 12, and a compressed air supply pipe 13 which is connected with the air inlet pipe 13 and is directed to cross the air inlet pipe 13. A blow hole 15 which blows compressed air into the antislip material container 12 and is directed downward is formed in the compressed air supply pipe 14. A nozzle portion 16 is arranged in the air inlet pipe 13. The nozzle portion is arranged to increase the velocity of the air which is supplied to the air inlet pipe 13 and passing through the air inlet pipe 13. A mixing pipe 17 in which the antislip materials 11 and the air is mixed is arranged in a downstream side of the nozzle portion 16. Specifically, a suction hole 18 through which the antislip material 11 in the antislip material container 12, and a connecting pipe 19 one end of which is connected with the mixing pipe 17 and the other end of which is opened in a cavity of the antislip material container 12 are arranged in the mixing pipe 17. A downstream end of the mixing pipe 17 is connected with an ejection pipe 20 which ejects the antislip material 11 together with the compressed air.

Figure 3:
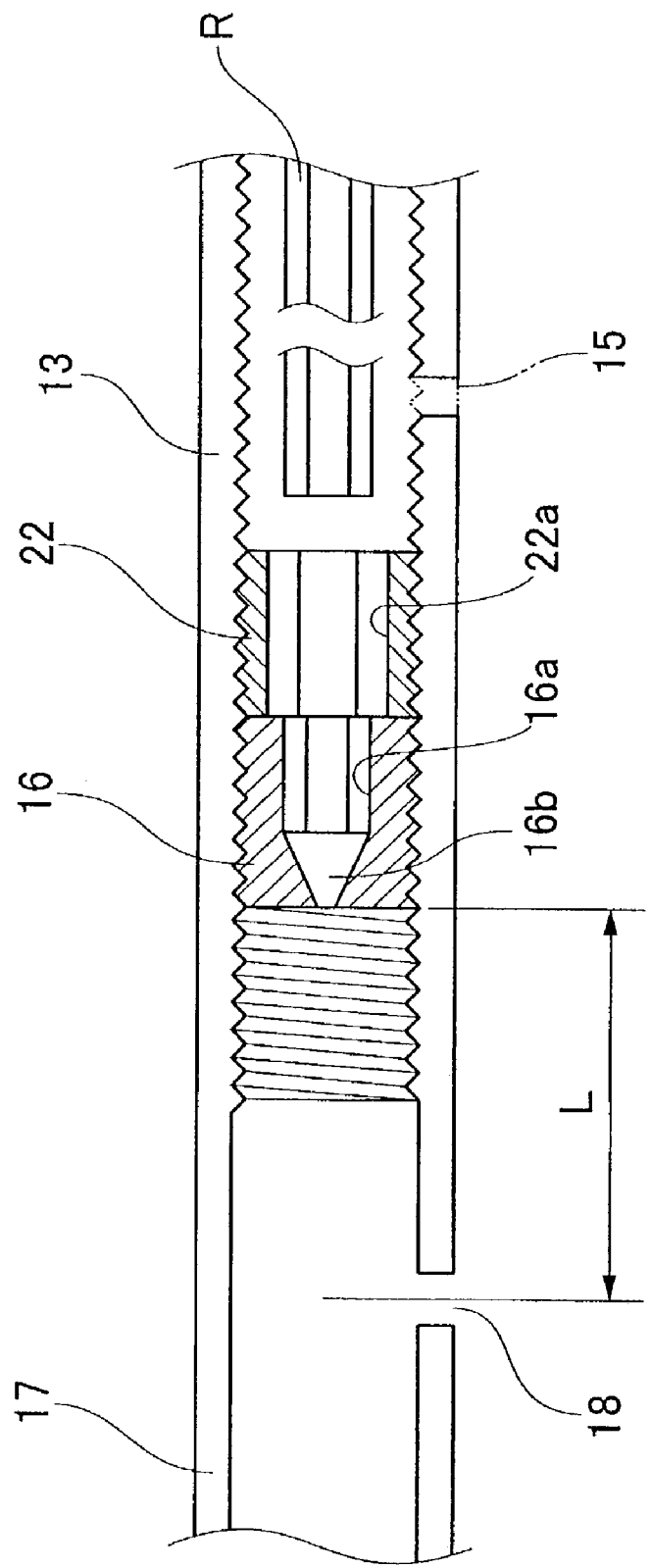
FIG. 3 is an expanded longitudinal sectional view of a main portion of the first embodiment.
Figure 4:
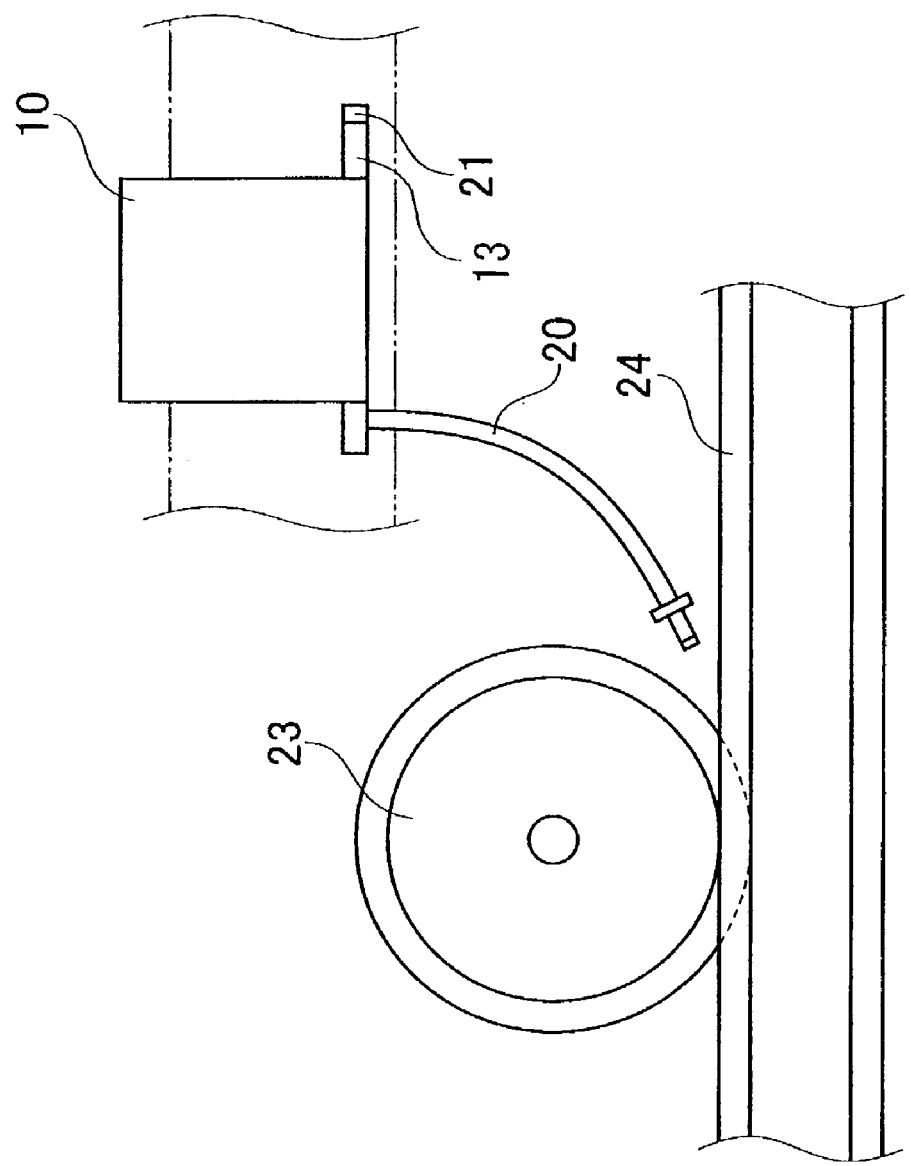
FIG. 4 is a side view of the first embodiment of the antislip material ejector which is arranged in a railcar.

A plug 21 is arranged coaxially to the air inlet pipe 13 so as to close one end of the air inlet pipe 13. The plug 21 comprises an external thread portion so as to be removably engaged with the air inlet pipe 13. One end of the air inlet pipe 13 can be opened by removing the plug 21. As shown in FIG. 3 an opening from which the pug 21 has been removed is used for inserting a tool R, such as a hexagonal wrench, which engages with a hexagonal socket which is formed at one end of the nozzle portion 16 so as to turn the nozzle portion 16. The plug 21 and the nozzle portion 16 are coaxially aligned along the axis of the air inlet pipe 13. The compressed air is supplied to the air inlet pipe 13 by the air supply pipe 14 which diagonally crosses to the air inlet pipe 13 in a horizontal plane. The direction of the air supply pipe 14 is not limited by the above diagonal direction, and other directions except a coaxial direction to the air inlet pipe 13 are possible. For instance, the air supply pipe 14 can be arranged so as to vertically cross the air inlet pipe 13 from a top portion of the antislip material container 12. In the case in which the compressed air supply pipe 14 is thus arranged vertically, it becomes necessary to arrange the blow hole 15 in the air inlet pipe 13. It is possible to use a compressed air supply pipe having a curved shape. In other words, direction and shape of the compressed air supply pipe by which the nozzle portion 16 and the end of the air inlet pipe 13, the opening of which is closed by the plug 21, are coaxially aligned.

An antislip material ejecting device which comprises all of the parts except the antislip material container 12 of the antislip material ejector of the above embodiment can be utilized in the gritbox of the conventional antislip material discharge device which is explained in the background art.

Figure 2:
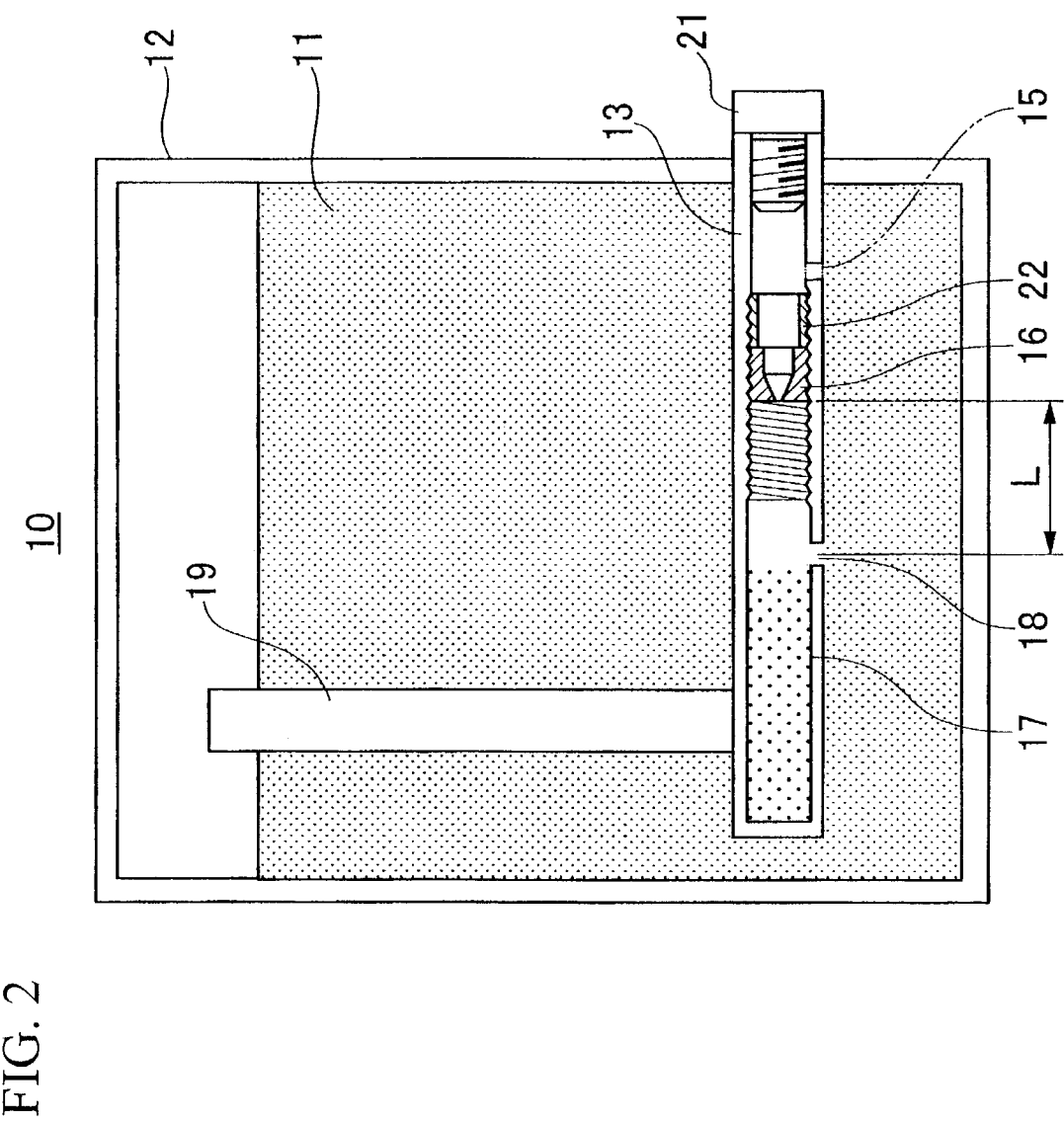
FIG. 2 is another longitudinal sectional view of the antislip material ejector of the first embodiment.

As shown in FIGS. 1 to 3, the blow hole 15 is arranged in a bottom end of the compressed air supply pipe 14. The nozzle portion 16 is engaged with the air inlet pipe 13 by engaging an external thread which is formed outer face of the nozzle portion 16 with an internal thread which is formed inner face of the air inlet pipe 13 so as to move forward and backward along an axis of the mixing pipe 17 and also to vary a distance to the suction hole 18 by turning. A hexagonal hole 16a which is used for a hexagonal socket is formed in a upstream side (an end which is located in a vicinity of the blow hole 15) of the nozzle portion 16 and a reduction area 16b which communicates with the hexagonal hole 16a are formed in the nozzle portion 16. In accordance with the Bernoulli effect, velocity of compressed air, which is supplied from the compressed air supply pipe 14, increases by passing the reduction area, and therefore, pressure of air flowing downstream of the reduction area 16b decreases.

Because the pressure of the air decreases, the antislip material 11 is drawn through the suction hole 18 into the mixing pipe 17 by the air passing near the suction hole 18. Because a lock-nut 22 is engaged with the air inlet pipe 13 and contacts the end of the nozzle portion 16, undesired movement, due to a vibration caused by the air flow, of the nozzle portion 16, is prevented. The lock-nut 22 is engaged with the air inlet pipe 13 by engaging an external thread on an outer face of the lock-nut with an internal thread on an inner face of the air inlet pipe 13. A hexagonal hole 22a larger than the hexagonal hole 16a is formed in the lock-nut 22 so as to insert another hexagonal wrench. The hexagonal hole 22a penetrates the lock-nut so as to pass the hexagonal wrench R, for turning the nozzle portion 16, which is inserted from the opening which is made by removing the plug 21.

It is possible to use another lock-nut 22 having a hexagonal hole 22a of a size which is the same as the hexagonal hole 16a in place of the lock-nut 22 having the hexagonal hole 22a larger than the hexagonal hole 16a. It is possible to turn the nozzle portion 16 and lock-nut 22 independently by adjusting a length of the hexagonal wrench R which is inserted into the air inlet pipe 13.

A bottom end of the connecting pipe 19 is connected with the mixing pipe 17 and a top end of the connecting pipe 19 opens in a cavity of the antislip material container 12 higher than a surface of the antislip material 11 in the antislip material container 12 in order not to introduce the antislip material 11 thereinto.

It is desirable for the air inlet pipe 13 and the mixing pipe 17 to be arranged as possible as low as possible in the antislip material container 12 so as to draw the antislip material 11 which remains near the bottom of the antislip material container 12.

Natural sand, silica sand, almina, mullite, ceramic particles such as silicone carbide, and metallic particles such as those of chrome, tungsten, molybdenum can be utilized for the antislip material 11. It is possible to use the antislip material 11 which has grain diameter between 10 µm and 500 µm.

An action of the antislip material ejector thus constructed will be explained.

A part of the compressed air supplied by the compressed air supply pipe 14 is discharged into the antislip material container 12 through the blow hole 15. The other part of the compressed air supplied by the compressed air supply pipe 14 flows into the mixing pipe 17 through the nozzle portion 16. The velocity of the compressed air passing through the nozzle portion 16 increases by passing through the nozzle portion 16 due to the reduction of the passage area. Therefore, in accordance with Bernoulli effect, as the velocity of the compressed air becomes higher the pressure of the compressed air becomes lower. Because the pressure in the suction hole 18 in the nozzle portion 16 becomes lower, the antislip materials 11 in the antislip material container 12 is drawn into the mixing pipe 17. The pressure at the suction hole 18 decreases due to a distance between the tip of the nozzle portion 16 and the suction hole 18. In other words, the distance becomes shorter as the degree of the decrease in pressure becomes larger so as to draw more antislip materials, and the distance becomes to be longer the degree of the decreasing pressure becomes to be smaller so as to draw less antislip material. On the other hand, the air flowing into the antislip material container 12 through the blow hole 15 further flows into the mixing pipe 17 through the suction hole 18 and the connecting pipe 19.

The degree of decrease in pressure at the suction hole 18 is defined by an interaction of parameters which are a discharge rate and a pressure of a compressed air which is supplied through the compressed air supply pipe 14, a cross section of the blow hole 15, a cross section of a flow line in the air inlet pipe 13, the distance L between the suction hole 18 and the nozzle portion 16, a pressure drop in the connecting pipe 19 etc. In this embodiment, it is possible to stably suction and eject the antislip materials 11 at a pressure range which is between a lower limit pressure at nearly 100 kPa and a higher limit pressure at more than 500 kPa.

Furthermore, because the compressed air from the blow hole 15 blows up from the bottom portion of the antislip material container 12, the frozen antislip materials 11 in the antislip material container 12 will be loosened. Further, the grit and another kinds of antislip materials tend to be compressed and also to be caked by a vibration of the railcar and moisture of the air over a long period, and it becomes to be difficult to loosen and also to eject the caked antislip material. In this embodiment, because the compressed air blow from the blow hole 15 and passing through the antislip material 11 expands, the expanding compressed air can deform the caked antislip material to be in a state of separate particles so as to be easily ejected.

The compressed air thus supplied through the above three ways to the mixing pipe 17 is ejected to a predetermined area between the wheel 23 and the rail 24 through the ejection pipe 20. The antislip material 11 thus ejected increases friction between the wheel 23 and the rail 24 and prevents a slipping, and therefore, a railcar can stably run on a rail even in rain and snow by maintaining predetermined friction between a wheel and a rail. Moreover, it is possible to stop a railcar within a predetermined distance safely.

The second embodiment of the antislip material ejector will be explained.

The second embodiment comprises antislip material ejecting devices in the antislip material container 12, the same as in the first embodiment. Each of the antislip material ejecting devices comprises an air inlet pipe 13 having an air blow hole 15, a nozzle portion 16 which is arranged in said air inlet pipe 13, a mixing pipe 17 in which the antislip materials are mixed with air and in which the suction hole 18 is formed and through which the antislip materials pass, a connecting pipe 19 one end of which is connected with the mixing pipe 17 and the other end of which opens in the cavity of the antislip material container 12, and an ejection pipe 20 which ejects the antislip materials together with compressed air.

Because a conventional antislip material discharge device controls a discharge rate of antislip material, the conventional antislip material discharge device having a plurality of discharge pipes cannot control each of the discharge pipes. In contrast, the antislip material discharge device of the second embodiment can control each of the discharge rate of the discharge devices by controlling each of the distances between the nozzle portion 16 and suction hole 18, and therefore it is possible to control the discharge rate of each ejection pipe 20.

By the antislip material discharge device of the second embodiment thus constructed, it is possible to arrange a plurality of antislip material discharge devices in the single antislip material container, and it is also possible to discharge the antislip materials with the discharge rates which are different from each other from the antislip material discharge devices.

In the above embodiment a diameter of the discharge pipe 20 is preferably 12 mm, and a diameter of a hole for discharging which is formed in a top portion of the discharge pipe 20 is preferably 2.5 mm in order to increase velocity of the air. However, for use in a low speed traffic such as a tramcar which runs at low speed, because it is not necessary to eject the air at the above high velocity, it is possible to omit a line for supplying the compressed air to the antislip material container and to open the antislip material container to atmospheric pressure. According to this construction, it becomes unnecessary to make the antislip material container an anti pressure vessel, and therefore, it is possible to produce the antislip material container at low cost and it is also possible to reduce the burden for maintenance, such as a leakage test for the antislip material container. Furthermore, it is also possible to omit the connecting pipe 19 for supplying the compressed air to the antislip material container.

What is claimed is:

1. An antislip material ejector comprising:
    an antislip material container which stores antislip material,
    an air inlet pipe which is arranged in said antislip material container,
    a compressed air supply pipe which supplies compressed air to said air inlet pipe,
    a nozzle portion which is arranged in said air inlet pipe,
    a mixing pipe, which is connected with said air inlet pipe, in which said antislip material is mixed with air and in which a suction hole through which said antislip material passes is formed,
    an ejection pipe which is connected with said mixing pipe and which ejects said antislip material together with the compressed air, wherein,
    said nozzle portion is arranged in said air inlet pipe as to adjust a distance to said suction hole and said air inlet pipe comprises a plug which is inserted into said air inlet pipe along an axis of said air inlet pipe and said nozzle portion can be pulled out of said air inlet pipe.

2. An antislip material ejector according to claim 1, further comprising
    a connecting pipe one end of which communicates with said mixing pipe and the other end of which communicates with a cavity in said antislip material container.

3. An antislip material ejector according to claim 1, wherein said nozzle portion is fixed by a lock nut in order not to move in an axial direction.

4. An antislip material ejector according to claim 2, wherein said nozzle portion is fixed by a lock nut in order not to move in an axial direction.

5. An antislip material ejector according to claim 1, wherein said air inlet pipe comprises a hole through which said compressed air in the compressed air supply pipe flows into said antislip material container.

6. An antislip material ejector according to claim 1, wherein said suction hole is directed downward.

7. An antislip material ejector according to claim 1, wherein said suction hole is directed downward.

8. An antislip material ejector according to claim 1, wherein said nozzle portion is engaged with an internal thread which is formed on an inner face of the air inlet pipe so as to adjust a position along the axis by a tool which is inserted from an opening which is formed by removing said plug which is inserted into one end of said compressed air supply pipe.

9. An antislip material ejector according to claim 7, wherein said nozzle portion is engaged with an internal thread which is formed on an inner face of the air inlet pipe so as to adjust a position along the axis by a tool which is inserted from an opening which is formed by removing said plug which is inserted into one end of said compressed air supply pipe.

10. An antislip material ejector according to claim 1, wherein at least one or more antislip material ejecting devices are arranged in said antislip material container, each of the at least one or more antislip material ejecting devices comprising:

the air inlet pipe having an air discharging hole, the nozzle portion which is arranged in said air inlet pipe, the mixing pipe in which the antislip materials are mixed with air and in which the suction hole is formed and through which the antislip material passes, the ejection pipe which is connected with said mixing pipe and which ejects the antislip material together with compressed air, and wherein, a discharge rate from each of said at least one or more antislip material ejecting devices can be arbitrarily set.

11. An antislip material ejector according to claim 9, wherein at least one or more antislip material ejecting devices are arranged in said antislip material container, each of the at least one or more antislip material ejecting devices comprising:

the air inlet pipe having an air discharging hole, the nozzle portion which is arranged in said air inlet pipe, the mixing pipe in which the antislip material is mixed with air and in which the suction hole is formed and through which the antislip material passes, the ejection pipe which is connected with said mixing pipe and which ejects the antislip material together with compressed air, and wherein a discharge rate from each of said antislip material ejecting devices can be arbitrarily set.

* * * * *